United States Patent
Kampmann et al.

(10) Patent No.: US 9,848,355 B2
(45) Date of Patent: Dec. 19, 2017

(54) CENTRALIZED DATA PLANE FLOW CONTROL

(75) Inventors: Dirk Kampmann, Vaals (NL); Andreas Witzel, Herzogenrath (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 824 days.

(21) Appl. No.: 14/346,904

(22) PCT Filed: Sep. 28, 2011

(86) PCT No.: PCT/EP2011/066934
§ 371 (c)(1),
(2), (4) Date: May 23, 2014

(87) PCT Pub. No.: WO2013/044956
PCT Pub. Date: Apr. 4, 2013

(65) Prior Publication Data
US 2014/0301203 A1  Oct. 9, 2014

(51) Int. Cl.
*H04L 12/801* (2013.01)
*H04W 28/02* (2009.01)
*H04W 28/10* (2009.01)

(52) U.S. Cl.
CPC ......... *H04W 28/0289* (2013.01); *H04L 47/10* (2013.01); *H04W 28/10* (2013.01)

(58) Field of Classification Search
None
See application file for complete search history.

(56) References Cited

U.S. PATENT DOCUMENTS

2004/0039820 A1  2/2004  Colby et al.
2006/0187821 A1*  8/2006  Watanabe ........... H04L 63/1458
                                                                370/229
(Continued)

FOREIGN PATENT DOCUMENTS

JP    WO2011043366    * 10/2010

OTHER PUBLICATIONS

Author Unknown, "Forwarding and Control Element Separation (forces)", IETF. http://datatracker.ietf.org/wg/forces/. Mar. 19, 2014. pp. 1-1. Version 5.2.0.
(Continued)

*Primary Examiner* — Gregory Sefcheck
*Assistant Examiner* — Jenkey Van
(74) *Attorney, Agent, or Firm* — Patent Portfolio Builders, PLLC (57) ABSTRACT

The invention relates to a central control entity (100) configured to control a data plane flow of a stream of data packages in an access network part of a mobile communications network, the central control entity comprising:—a detecting unit (140), configured to detect a presence of data plane applications (300) linked to forwarding elements (200) of the access network part, configured to detect information about a type of data plane application that is to be applied to said data plane flow, and configured to detect flow information reports from forwarding elements (200) which are directly linked to one network node containing the determined type of data plane application, each flow information report from one of the forwarding elements (200) containing information about a data packet volume transmitted from said one forwarding element to said one data plane application,—a flow control unit (110) configured to determine a path of the data plane flow through the forwarding elements (200) of the access network part to one of the network nodes (Continued)

containing the determined type of data plane application (300), wherein the flow control unit (110) is configured to determine a load of said one data plane application provided on said one network node, taking into account the flow information reports from the forwarding elements (200) which are directly linked to said one data plane application, wherein the flow control unit (110) determines the path of the data plane flow, taking into account the determined load of said one data plane application.

8 Claims, 5 Drawing Sheets

(56) References Cited

U.S. PATENT DOCUMENTS

| | | | |
|---|---|---|---|
| 2009/0003375 A1 | 1/2009 | Havemann et al. | |
| 2011/0283016 A1* | 11/2011 | Uchida | G06F 9/505 709/235 |
| 2012/0023231 A1* | 1/2012 | Ueno | H04L 45/38 709/225 |
| 2012/0140637 A1* | 6/2012 | Dudkowski | H04L 45/00 370/238 |

OTHER PUBLICATIONS

Author Unknown, "Open Networking Foundation", http://www.opennetworkingfoundation.org/. 2014. pp. 1-2.

Author Unknown, "OpenFlow", OpenFlow Switch Specification, Version 1.1.0. Enabling Innovation in Your Network. Archive. htpp://www.openflow.org/. 2011. pp. 1-3.

Wolf, T., "In-Network Services for Customization in Next-Generation Networks," IEEE Network; Jul. 1, 2010. pp. 6-12. vol. 24, Issue 4.

Yang, L. et al. "Forwarding and Control Element Separation (ForCES) Framework." Network Working Group Request for Comments 3746. The Internet Society. 2004.

\* cited by examiner

CENTRALIZED DATA PLANE FLOW CONTROL

TECHNICAL FIELD

The present invention relates to a central control entity configured to control a data plane flow of a stream of data packages in an access network part of a mobile communications network, to a method for controlling the data plane flow, to a forwarding element of the access network part forwarding the data plane flow, and to a method for operating the forwarding element.

BACKGROUND

One of the tasks of a mobile communications network is to transport data flows from a network access point towards an application located somewhere in the network. One aspect of this task is how to react if the application becomes overloaded.

An application is a data plane application and examples of data plane applications are policy and enforcement functions, service aware traffic shaping, transcoding, transrating, media caching, packet inspection etc. By way of example, in a data plane application there is a packet inspection application in which the data packets are expected to identify malicious data.

Furthermore, a split router architecture is known in which a common router is split into two elements, as known inter alia from a ForCES documentation in IETF at http:datatracker.ietf.org/wg/forces. In this split router architecture a central control entity (CE) is provided responsible for managing the routing protocol and the connectivity of the data plane. The central control entity controls the data plane connectivity through the forwarding elements (FE).

The forwarding element is responsible for forwarding traffic in the data plane, the forwarding element establishing the connectivity to neighbour nodes based on instructions received from the central control entity.

The problem is how to prevent overload of a data plane application in the network. The mechanisms known in the art today are based on the mechanism that the application starts to build up back pressure, when it starts to run out of capacity. In such a situation new incoming data flows are rejected by a data plane application with specific reason codes. Preceding nodes or the data flow source receiving the reason codes can try to find an alternative instance for the targeted application. However, this means that the data flow is first routed to the overloaded application. This routing consumes network capacity. The application then has to reject the data flow, this rejection also requiring capacity from the application, a so-called blind load. The rejection is then routed back again consuming network capacity.

Furthermore, all data flow sources have to implement mechanisms to find alternative instances/alternative network nodes having the same type of application.

SUMMARY

Accordingly a need exists to avoid blind load and to avoid data flows that are due to an overload of a data plane application.

This need is met by the features of the independent claims. In the dependent claims preferred embodiments of the invention are described.

According to a first aspect of the invention a central control entity configured to control a data plane flow of a stream of data packages in an access network part of a mobile communications network is provided. The central control entity comprises a detecting unit configured to detect a presence of data plane applications linked to forwarding elements of the access network part. The detecting unit is furthermore configured to detect information about a type of data plane application that is to be applied to said data plane flow and configured to detect flow information reports from forwarding elements which are directly linked to one network node containing the determined type of data plane application. Each flow information report from one of the forwarding elements contains information about the data packet volume transmitted from said one forwarding element to said one data plane application. The central control entity furthermore contains a flow control unit configured to determine a path of a data plane flow through the forwarding elements of the access network part to one of the network nodes containing the determined type of data plane application. The flow control unit is configured to determine a load of said one data plane application provided on said one network node taking into account the flow information reports from the forwarding elements which are directly linked to said one data plane application. The flow control unit can then determine the path of the data plane flow, taking into account the determined load of said one data plane application. The applications can be provided in the access network part. However, applications may be provided in the core network, the access network providing the access to the core network. Applications can be provided on top of the forwarding element, or are linked to the forwarding element. If the application is in the core network, and assuming that the core network is not (yet) built using CEFE split architecture, then the application in the core network is linked to an FE.

The access network can be a radio access network, a WLAN access network, a WiFi access network, or a satellite access network used to access the mobile communications network.

The central control entity is able to determine the load of a data plane application based on the flow information reports from the forwarding elements which are directly linked to the data plane application and which forward the data flows to the data plane application. The central control entity can, thus, determine a load of a data plane application for which a direct connection of the data plane application to report its load may not exist. The central control entity can accumulate the flow information reports from the forwarding elements which are capable of transmitting a data plane flow to an application. Based on these flow reports the load of the application can be determined without the need of the data plane application reporting its load.

It is possible that at least two network nodes are provided in the access network part containing the determined type of data plane application. In this example, when a data plane application is provided on different network nodes, the flow control entity may be configured to determine the load of said at least two network nodes containing the determined type of data plane application to be applied to the data plane flow. The flow control unit may then be configured to distribute the data plane flow to said at least two network nodes, taking into account the load of said at least two network nodes. In this example, the central control entity is able to balance the load to different data plane applications of the same type and is able to share the load between the different data plane applications for a data plane flow. The central control entity is able to balance the load between applications of the same type. Thus, an overload of one of the applications can be avoided effectively, as a data plane flow can be directly transferred to a data plane application of the same type provided on another network node without the need to first forward the data plane flow to the overloaded application, the application rejecting the flow in view of the overload.

Furthermore, the detecting unit of the central control entity may be configured to detect a new data plane flow report from one of the forwarding elements, this new data plane flow report including information that a new data plane flow has entered the access network part controlled by the central control entity. The detecting unit may be configured to determine the type of data plane application to be applied to the new data plane flow, and the flow control unit may be configured to determine to which network node containing the data plane flow of the determined type the new data plane flow is forwarded. When a forwarding element detects that an incoming data plane flow does not match any existing flow, the forwarding element can generate the new data plane flow report and report it to the central control entity where it is decided which data plane application should be applied and to which network node/ instance of the determined type of data plane application the data plane flow should be transferred taking into account the load of the data plane applications. This further helps to prevent an overload of an application by determining the data plane application to be applied already at the entry point into the network, here the access network part. When several data plane applications exist that can handle the new data plane flow, the flow control unit can determine the flow path for the new data plane flow based on the load of the data plane applications of the determined type.

The flow control unit may be able to determine a load of said one data plane application by using a predefined scaling factor to calculate a load of said one data plane application based on a data packet volume transmitted to said one data plane application. The predefined scaling factor depends on the type plane application. When a forwarding element reports a certain data plane flow, i.e. a certain flow of packets, the central control entity has to determine the load of the application based on the reported packet flow. However, the load can depend on the type of application. By way of example, if the application is an application that only stores the data plane flow, the corresponding load of the application may be low. If the application is an application including, by way of example, to transcode the data plane flow, the same packet flow may mean a high load for the application. The scaling factor takes this difference into account and provides information about an application load for a number of data packets. Based on the predefined scaling factor, the central control entity can calculate the sum of all data plane flow to a particular data plane application and can determine the load by applying the scaling factor for said data plane application to the determined sum.

Furthermore, it is possible that data plane applications directly provide a load feedback to the central control entity. The detecting unit of the central control entity may then be configured to detect the load reports received directly from the data plane applications, each load report containing information about a processing load and/or the processing capacity of a data plane application. The flow control unit is then configured to determine the path of the data plane flow, taking into account the load reports from the data plane applications. The flow control unit may determine the path of the data plane flow, taking into account the load reports from the data plane applications and the flow information reports from the forwarding elements.

Furthermore, the forwarding elements may determine the network capacity from a forwarding element to a next network node. The detecting unit of the central control entity may be configured to detect network capacity reports from the forwarding elements. Each network capacity report can include information about a transport network capacity from a reporting forwarding element to a next network node of the mobile communications network. The flow control unit may, in this embodiment, control the data plane flow to the different applications taking into account different reports, e.g. by taking into account the network capacity information deduced from the network capacity reports, the flow information reports, and/or the load reports directly from the applications.

The detecting unit of the central control entity may be configured to determine the network nodes on which data plane applications in the access network part are provided, using an audit mechanism of a open flow protocol. The central control entity can then learn about the placement of the applications in the network using this audit mechanism. Applications linked to FEs and which do not have a direct connection to the central control entity may be defined via administration in the central control entity, e.g. by defining the destination address of the application, which sufficiently characterizes the flow.

The invention furthermore relates to a method for controlling, by a central control entity, the data plane flow of a stream of data packages in the access network part. The method comprises the step of detecting a presence of data plane applications linked to forwarding elements of the access network part and the step of detecting information about a type of data plane application that is to be applied to the data plane flow. Furthermore, flow information reports from the forwarding elements are detected which are directly linked to one network node containing the determined type of data plane application. Each flow information report from one of the forwarding elements contains the information about a data packet volume transmitted from said one forwarding element to said one data plane application. Furthermore, a path of the data plane flow through the forwarding elements of the access network part is determined to one of the network nodes containing the determined type of data plane application. Furthermore, the load of said one data plane application provided on said one network node is determined taking into account the flow information reports from the forwarding elements which are directly linked to said one data plane application. The path of the data plane flow is then determined taking into account the determined load of said one data plane application.

The path of the data plane flow through the network can be determined as mentioned above.

The invention furthermore relates to a forwarding element of the access network part of the mobile communications network to which a data plane application is linked. The forwarding element comprises a receiver configured to receive instructions from the central control entity controlling the data plane flow of the stream of data packages in the access network part. The forwarding element contains a processing unit configured to pass a data plane flow to the data plane application based upon the instructions of the central control entity. The processing unit is furthermore configured to detect a data packet volume transmitted from the forwarding element to the data plane application linked to the forwarding element. The processing unit is configured to generate a flow information report including the information about the data packet volume transmitted from the forwarding element to the data plane application. The forwarding element furthermore contains a transmitter configured to transmit the flow information report to the central control entity.

As described above the central control entity uses the flow information report from the forwarding element to determine a load of the data plane application.

The forwarding element may furthermore be configured to generate the new data plane flow report mentioned above.

The invention furthermore relates to a method for operating the forwarding element of the access network part of the mobile communications network, the data plane application being linked to the forwarding element. The method comprises the step of receiving instructions from the central control entity controlling the data plane flow of a stream of data packages in the access network part. The data plane flow is then passed to the data plane application linked to the forwarding element based upon the instructions of the central control entity. Furthermore, a data packet volume transmitted from the forwarding element to the data plane application linked to the forwarding element is detected and the flow information report including the information about the data packet volume transmitted from the forwarding element to the data plane application is generated and transmitted to the central control entity.

BRIEF DESCRIPTION OF THE DRAWINGS

The invention will be described in further detail below with reference to the accompanying drawings, in which.

DETAILED DESCRIPTION

Figure 1:
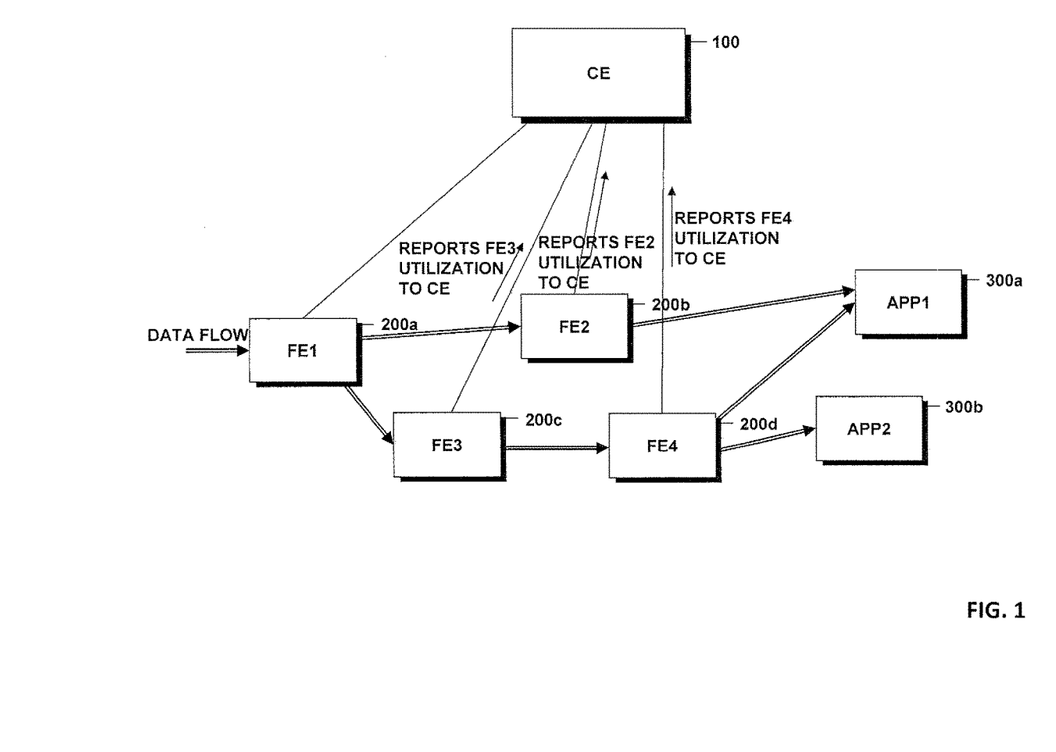
FIG. 1 shows a schematic view with a central control entity determining a flow of an application based on flow reports from forwarding elements.

FIG. 1 shows a network layout in which a central control entity 100 acting as a central node has a bird's eye view of the network and its applications. The network components shown in FIG. 1 are components of the access network part, e.g. a mobile backhaul network. The network part shown can be part of the high radio access network (High-RAN) or of the low radio access network (Low-RAN), the high RAN normally using a ring topology with the network nodes being provided in a ring structure, whereas in the low RAN part a tree structure of the network nodes is often used. The access network part is, however, not restricted to a radio access network part. Other access networks such as WLAN, WiFi, satellite are also feasible. The central control entity is responsible for the connectivity of the data plane and controls the data plane connectivity through the forwarding elements 200a-200d which forward the data plane traffic based on the instructions received from the central control entity 100. The forwarding elements 200a-200d forward data plane flow to different applications 300a, 300b. As can be deduced from FIG. 1, the applications 300a and 300b do not have their own reporting interface to the central control entity 100. The applications App1 and App2 shown in FIG. 1 may be of the same type, or may be of a different type. When both applications are of the same type, a data flow entering the network at forwarding element 200a is forwarded either to the application 300a (App1) or the application 300b (App2). The data plane application to be applied to the data plane flow may be of any type, be it the recording of video data or the inspection of data packets or any other type. The whole data plane flow might be forwarded to application 300a or to application 300b or to both of them. The central control entity 100 may determine how to route the flow through the network in the following way. Each of the forwarding elements FE1-FE4 detects a data packet volume of the data plane flow transmitted from the forwarding element to the next network node or to its annexed data plane application. Each forwarding element generates a flow information report including the information about the data packet volume transmitted from the forwarding element to the next network node. The central control entity can then combine the flow information reports from their forwarding elements which are directly linked to an application, in the example shown the flow information report from forwarding element 200b and the flow information report from forwarding element 200d. These two forwarding elements 200b and 200d transfer a data plane flow to application 300a. In this example there is no need for FE1 to report the data volume of the flow, on the other hand it doesn't harm if the FE1 reports, but the CE can decide which of the available information to use for the decisions. The central control entity can then combine the flows from forwarding element 200b and 200d to determine the overall data volume transferred to application 300a.

Figure 2:
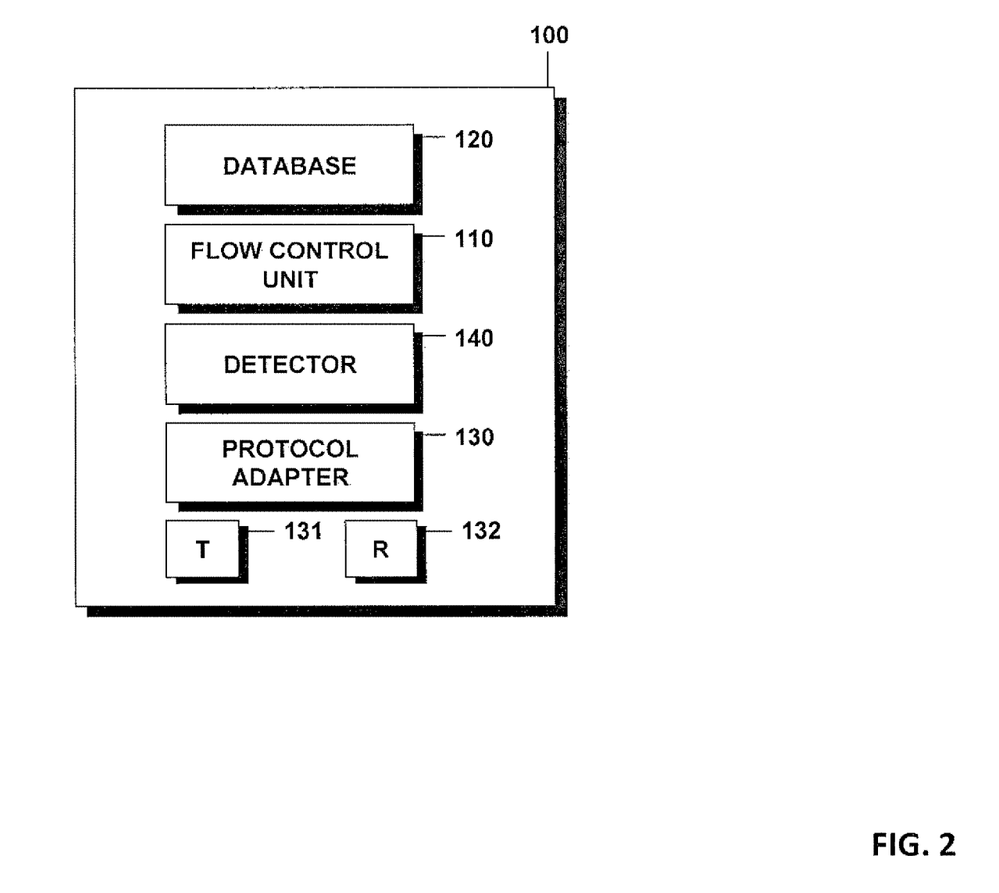
FIG. 2 is a schematic, more detailed view of the central control entity shown in FIG. 1.

The central control entity 100 can then determine the load of application 300a by using a predefined scaling factor stored in a database 120 of the central control entity shown in FIG. 2. The load of an application now mainly depends on the type of application. By way of example, a forwarding element 200b detects a data packet flow of 10 Mbitsec for a flow. The question now is what this means in terms of load for application 300a. If the 10 Mbitsec is a video stream and the application has to transcode the video, then this can mean a high load for the application. If the application, however, is an application that only has to store the received video, then the load of the application may be very low as the stream is only stored. The predefined scaling factor now takes into account this difference and gives an application load per number of data packets. The control entity, using the predefined scaling factor can then calculate the sum of all flows and, by multiplying the complete flow to the predefined scaling factor, an estimation of the application load is obtained.

Referring back to the example shown in FIG. 1, the central control entity detects the flow information reports from forwarding elements 200b and 200d to determine the load of application 300a and the central control entity determines the load of application 300b based on the flow information report reporting the flow from forwarding element 200d to application 300b. The central control entity can be informed about the presence of applications having no direct connection to the central control entity in the following way:

The application can be defined via administration in the CE 100, e.g. by defining the destination address of the application, which sufficiently characterizes the flow. Another way could be to combine a DHCP (Dynamic Host Configuration Protocol) server with the CE. When applications are started, they request via DHCP a network address. The application type can be reported within the DHCP procedure to the DHCP server. The DHCP server, being combined with the CE, can report this to the CE and the CE builds up a table with application type and related network address.

Figure 3:
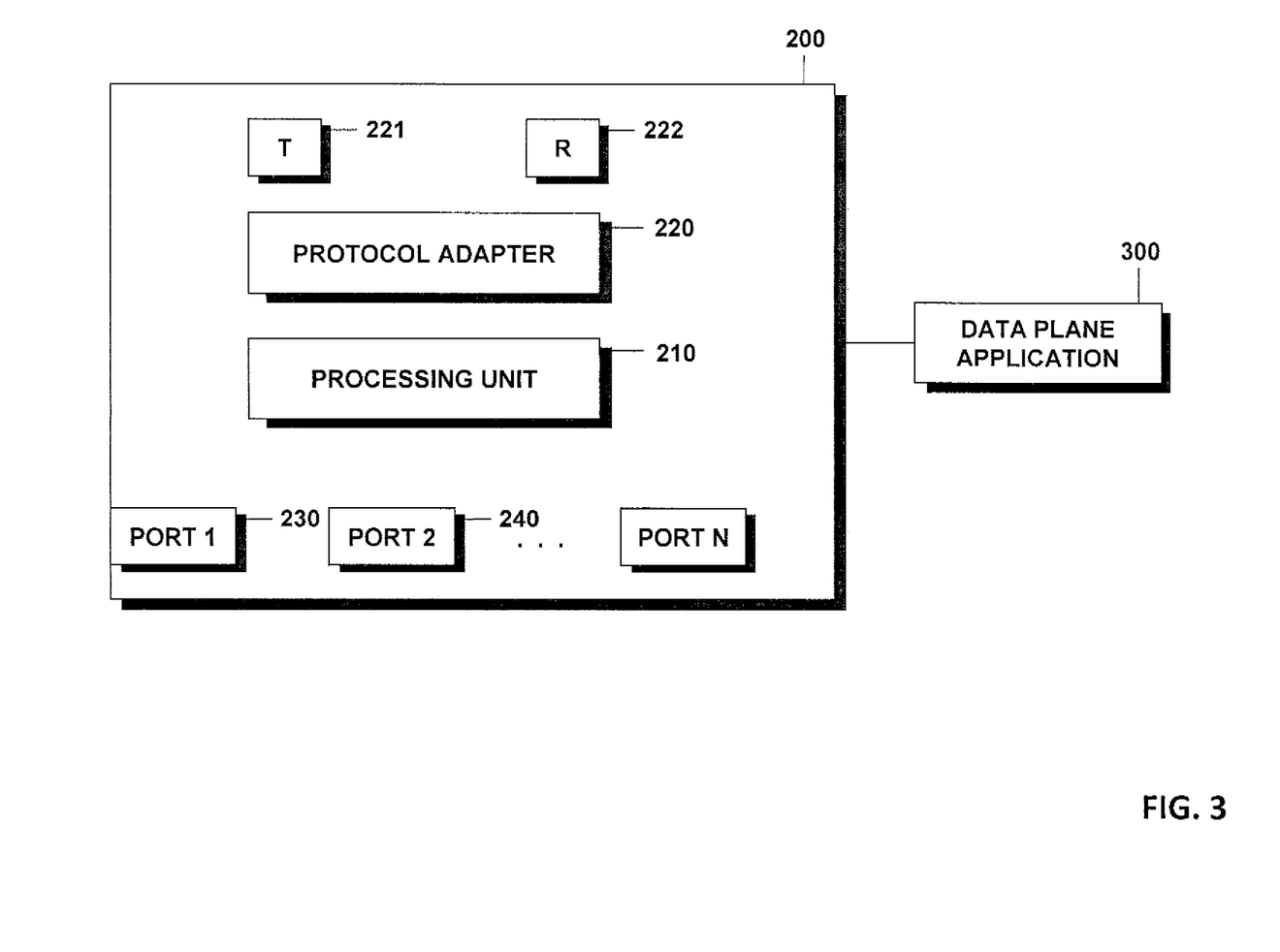
FIG. 3 is a schematic, more detailed view of a forwarding element shown in FIG. 1.

In connection with FIG. 3 a more detailed view of the forwarding element is shown. The forwarding element contains a processing unit 210 that passes the data plane flow to the data plane application 300 based on the instructions received from entity 100. The data plane application may be incorporated into the forwarding element or may be linked to the forwarding element. The data plane flow enters the forwarding element 200 through one of the ports 230, 240 and is forwarded to the data plane application through another port based on the instructions received from the central control entity 100 via receiver 222. A protocol adapter 220 is provided that is configured to adapt the instructions using the protocol that is used to communicate between the different entities. The forwarding element furthermore contains transmitter 221 to transmit the flow information report to the central control entity 100 where it is received from receiver 132 shown in FIG. 2.

The processing unit 210 of the forwarding element 200 detects the data plane volume and generates the flow information report that is transmitted to the central control entity.

As shown in more detail in FIG. 2, the flow information reports are detected by detecting unit 140, and the flow control unit 110 determines the load of data plane application 300 based on the flow reports from the forwarding elements which provide a data plane flow to said data plane application.

One possible communication protocol between the forwarding element and the central control entity may be the OpenFlow protocol or ForCES protocol. The OpenFlow protocol furthermore provides a mechanism where the central control entity 100 can audit the capabilities of the forwarding elements. This auditing mechanism can be used by the central control entity to learn about the placement of the applications in the network. A forwarding element may find the responsible control entity in different ways. By way of example, the address of the central control entity can simply be administered within the forwarding element by a network administrator or within the application by the application provider. Furthermore, it is possible that a forwarding element auto-detects the central control entity by an existing broadcasting auto-configuration mechanism such as DHCP.

The central control entity 100 also contains a protocol adapter 130 to adapt the information transmitted or received to the protocol used at the corresponding interface.

The central control entity 100 may furthermore receive network capacity reports from the different forwarding elements. In these network capacity reports, each forwarding element reports a network capacity from a reporting forwarding element to a next network node of the mobile communications network. The flow control unit can then determine how to distribute a data plane flow to different applications not only based on the flow information reports, but also based on the network capacity reports informing the central control entity about a transport network capacity from the reporting forwarding element, e.g. to the desired application.

In FIGS. 2 and 3 only the components of the forwarding element and the central control entity are shown which are necessary for the understanding of the invention. Furthermore, the different elements are shown as functional entities. It should be understood that a forwarding element or the central control entity can have additional functions and elements, however, for the sake of clarity, the description of these elements has been omitted in the present application. The functional entity shown may furthermore be incorporated by software or hardware or by a combination of software and hardware.

Figure 4:
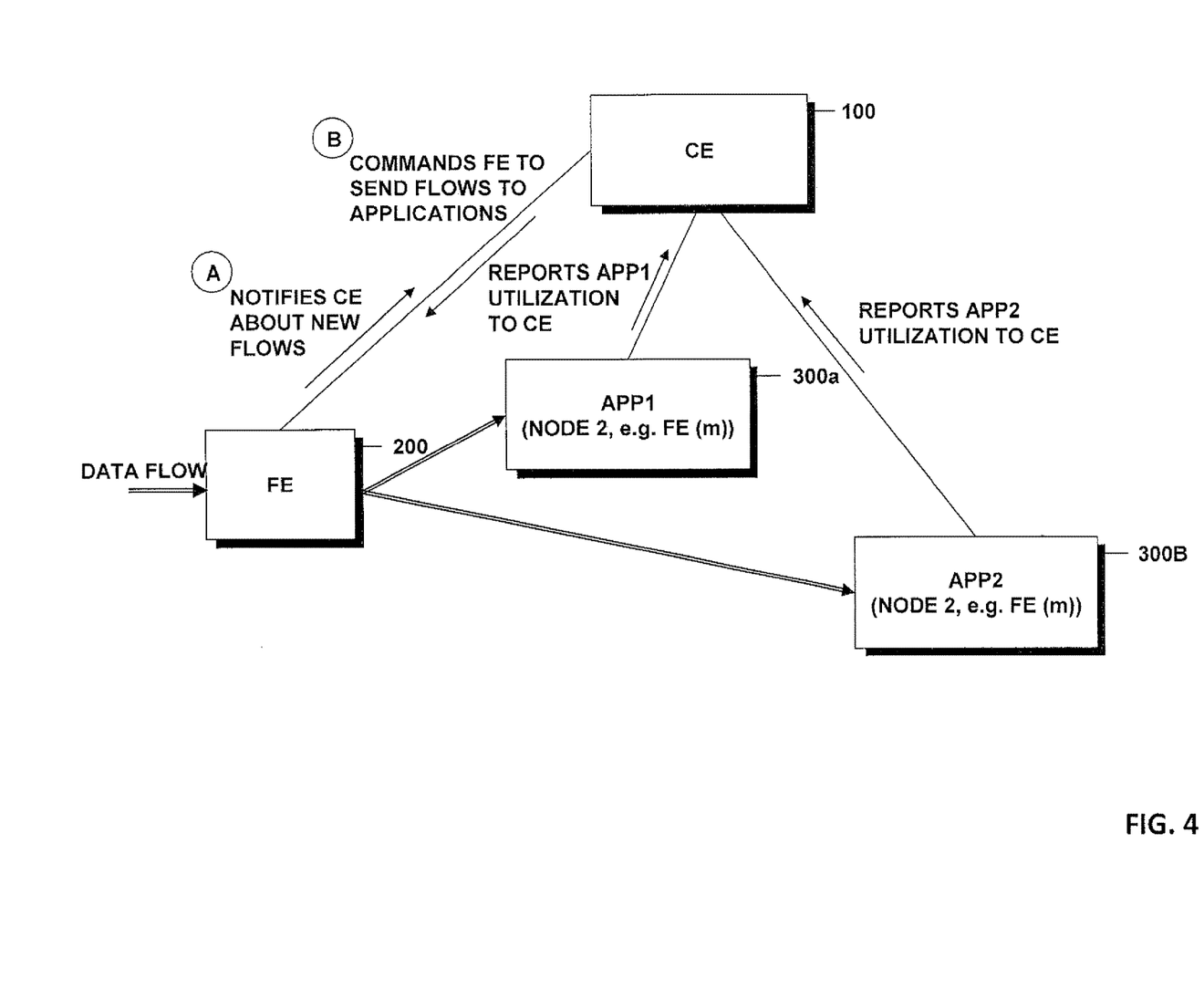
FIG. 4 shows a schematic view of network components where data plane applications report their load to the central control entity.

In FIG. 4 a further embodiment of the invention is disclosed. In the embodiment shown in FIG. 4 the applications 300a and 300b can directly report their existence and periodically the current load or capacity to the central control entity 100. When a new data flow enters the network the first forwarding element reports this new data flow to the central control entity. By way of example, the forwarding element may detect that an incoming packet does not match any existing flow handling entry. As the forwarding element does not know how to handle this flow, it is reported as a new flow to the central control entity 100. This new data plane flow report is shown in FIG. 4 by A and by the arrow from forwarding element 200 to the central control entity 100. Furthermore, the applications 300a and 300b have direct connections to the central control entity and report their load or capacity to the central control entity 100. The central control entity now has an overview over the existing data plane applications and has an overview over the load of the different applications, either from the applications directly, as shown in FIG. 4, or from the flow information reports from their forwarding elements, as shown in FIG. 1. Based on the load of the different applications the central control entity, especially the flow control unit 110, is able to determine a path of the data plane flow through the network. The central control entity, after having determined to which data plane application the flow should be forwarded, instructs the FE 200 to flow to the determined data plane application.

The flow control unit can now use the flow information reports, the load reports from the directly connected data plane applications and the network capacity reports to determine how a data plane flow is routed through the network. Furthermore, the central control entity determines, for a new data plane flow reported by forwarding element 200a in the example shown in FIG. 4, the type of data plane application to be applied to the data plane flow and determines to which application the data plane flow is forwarded. The central control entity determines which of the possible applications instances or network nodes shall handle the data flow. As discussed above, the decision may depend on several criteria such as the current load of the possible applications, a load distribution scheme such as an energy-optimized distribution, an even distribution, a round robin's etc. The flow control unit may further take into account the transport network capacity from the reporting forwarding element to the destination application. After the central control entity has decided which application instance to use for the data plane flow or which applications, the central control entity instructs the forwarding element or forwarding elements to forward the flow towards the determined application instances or instance.

In the example shown in FIG. 1, it is assumed that both applications provide the same type of application. The different forwarding elements report their utilization and transport link capacity to the central control entity which then has the freedom to select different alternatives. In a first alternative, the data plane flow is forwarded from forwarding element 200a to forwarding element 200c from where it is forwarded to forwarding element 200d before it is forwarded to application 300b. In another alternative, the data plane flow is forwarded from forwarding element 200a to forwarding element 200b and to application 300a. In another example, the central control entity may determine the following flow from forwarding element 200a to forwarding element 200c, to forwarding element 200d to application 300a.

Depending on the link utilization, the utilization of the forwarding element and the utilization of the application itself, the central control entity can optimize the data flow. The central control entity may furthermore monitor the load of the forwarding elements 200b, 200c and 200d based on the utilization reports of these network elements. Depending on the load the central control entity may either choose the path of forwarding element 200a, forwarding element 200c, forwarding element 200d, application 300b or of forwarding element 200a, forwarding element 200b, application 300a.

In the utilization report from a forwarding element to the central control entity, the central control entity may identify the application, e.g. via an n-tuple of packet field entries. The central control entity can contain database 120 with an information about the n-tuple together with the application identity.

With the example shown above an application overload early in the network can be avoided without the problems of blind load in the application.

An overload of an application can be avoided by determining the application for a data plane flow already at an entry point into the network. If several applications of the same type are provided a load balancing between the applications is possible. Furthermore, the central control entity can perform an intelligent path selection avoiding an overload of the network segments.

Figure 5:
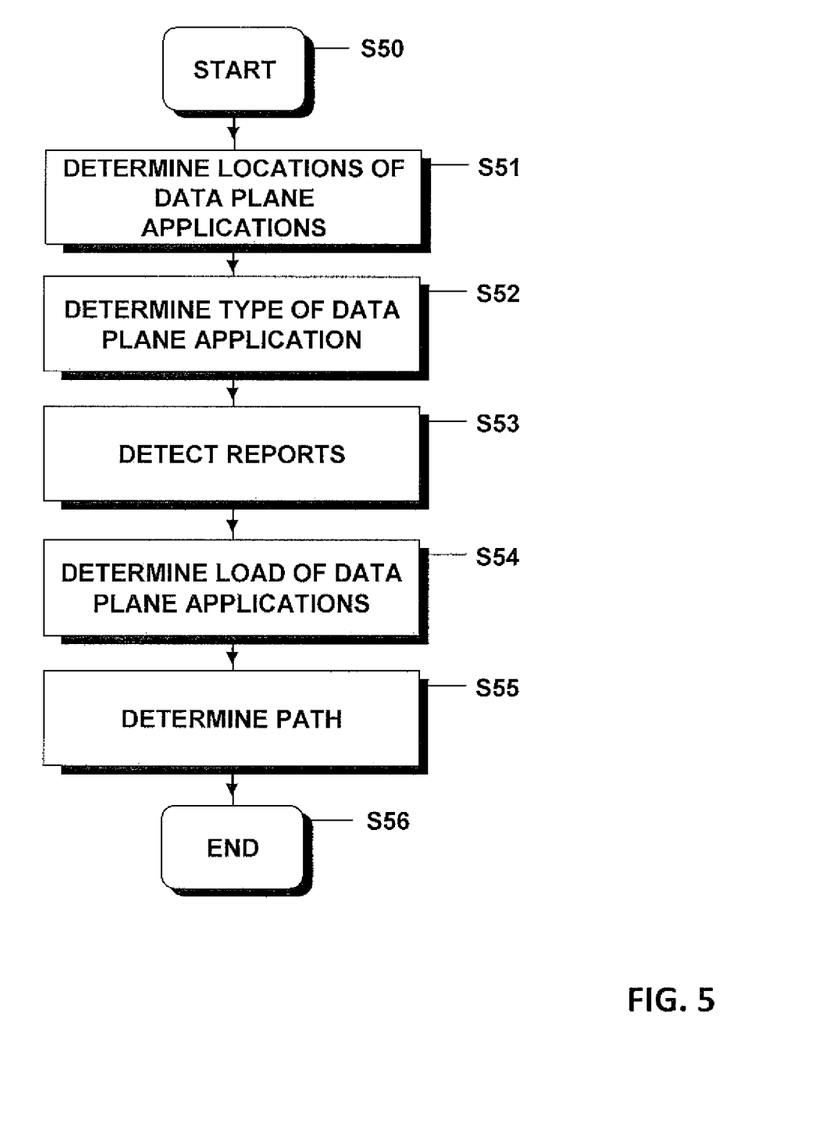
FIG. 5 shows a flow chart comprising the steps for determining a flow path carried out in the central control entity.

In FIG. 5 the different steps are summarized that can be carried out by the central control entity to determine a flow path. The method starts in step S50. In step S51 the locations of the data plane applications are determined so that the central control entity is aware of where the different data plane applications are located in the network. In step S52 the type of data plane application provided at the different locations is determined. After step S52 the central control entity is aware of the different data plane applications and the location of the different data plane applications. In the next step, S53, the reports from the forwarding elements are detected. Furthermore, the reports from the data plane applications directly are detected. The reports can include the flow information report, the new data plane flow report and/or the network capacity report from the different forwarding elements. Based on the different reports, the central control entity can determine the load of the data plane applications in step S54 and can then determine, in step S55, the path of the data plane flow through the network to the selected data plane application. The method ends in step S56.

The above procedure helps to avoid blind load in the different applications as no data plane flow has to be rejected by an application. Furthermore, in the network itself no knowledge of alternative applications needs to be provided, neither in the network nor at the data flow sources. It is possible to evenly distribute the load, e.g. to provide an energy-optimized load distribution. Furthermore, the adding or the extending of an application only requires changes in one node.

The invention claimed is:

1. A central control entity configured to control a data plane flow of a stream of data packages in an access network part of a mobile communications network, the central control entity comprising:
a first circuitry, configured to detect a presence of data plane applications linked to forwarding elements of the access network part, configured to detect information about a type of data plane application, to be applied to said data plane flow, configured to detect network capacity reports from the forwarding elements, each network capacity report including information about a transport network capacity from a reporting forwarding element to a next network node of the mobile communications network, and configured to detect flow information reports from forwarding elements, wherein the forwarding elements are directly linked to one network node containing the determined type of data plane application, each flow information report from one of the forwarding elements containing information about a data packet volume transmitted from said one forwarding element to said one data plane application, and
a second circuitry configured to determine a path of the data plane flow through the forwarding elements of the access network part to one of the network nodes containing the determined type of data plane application, wherein the second circuitry is configured to determine a load of said one data plane application provided on said one network node, taking into account the flow information reports from the forwarding elements which are directly linked to said one data plane application, wherein the second circuitry is configured to determine the path of the data plane flow, taking into account the determined load of said one data plane application and load reports received directly from said one data plane application, each of the load reports containing information about a processing load and a processing capacity of said one data plane application, wherein, when at least two network nodes are provided containing same type of data plane applications, the second circuitry is configured to determine the load of said at least two network nodes and is configured to distribute the data plane flow to said at least two network nodes containing the same type of data plane applications, taking into account the load of said at least two network nodes, wherein the central control entity uses the flow information reports, the load reports from the directly connected data plane applications, and the network capacity reports to determine how the data plane flow is routed through the mobile communications network.

2. The central control entity according to claim 1, wherein the first circuitry is configured to detect a new data plane flow report from one of the forwarding elements including information that a new data plane flow has entered the access network part controlled by the central control entity, and configured to determine the type of data plane application to be applied to the new data plane flow, wherein the second circuitry is configured to determine to which network node containing the data plane application of the determined type the new data plane flow is forwarded.

3. The central control entity according to claim 1, wherein the second circuitry is configured to determine a load of said one data plane application, by using a predefined scaling factor to calculate a load of said one data plane application based on the data packet volume transmitted to said one data plane application, the predefined scaling factor depending on the type of data plane application.

4. The central control entity according to claim 1, wherein the first circuitry is configured to detect the load reports.

5. The central control entity according to claim 1, wherein the first circuitry is configured to determine the network nodes on which the data plane applications in the access network part are provided using an audit mechanism of an openflow protocol.

6. A method for controlling, by a central control entity, a data plane flow of a stream of data packages in an access network part of a mobile communications network, the method comprising the steps of:
    detecting a presence of data plane applications linked to forwarding elements of the access network part,
    detecting information about a type of data plane application, to be applied to said data plane flow,
    detecting network capacity reports from the forwarding elements, each network capacity report including information about a transport network capacity from a reporting forwarding element to a next network node of the mobile communications system,
    detecting flow information reports from forwarding elements which are directly linked to one network node containing the determined type of data plane application, each flow information report from one of the forwarding elements containing information about a data packet volume transmitted from said one forwarding element to said one data plane application,
    determining a path of the data plane flow through the forwarding elements of the access network part to one of the network nodes containing the determined type of data plane application,
    determining a load of said one data plane application provided on said one network node taking into account the flow information reports from the forwarding elements, wherein the forwarding elements are directly linked to said one data plane application, wherein the path of the data plane flow is determined taking into account the determined load of said one data plane application and load reports received directly from said one data plane application, each of the load reports containing information about a processing load and a processing capacity of said one data plane application, wherein, when at least two network nodes are provided containing same type of data plane applications, the load of said at least two network nodes is determined and the data plane flow is distributed to said at least two network nodes containing the same type of data plane applications, taking into account the load of said at least two network nodes, and
    using the flow information reports, the load reports from the directly connected data plane applications, and the network capacity reports to determine how the data plane flow is routed through the mobile communications network.

7. The method according to claim 6, wherein the load of said one data plane application is determined by using a predefined scaling factor to calculate a load of said one data plane application based on the data packet volume transmitted to said one data plane application, the predefined scaling factor depending on the type of data plane application.

8. The method according to claim 6, further comprising the step of:
    detecting a new data plane flow report from one of the forwarding elements including information that a new data plane flow has entered the access network part controlled by the central control entity,
    determining a type of data plane application to be applied to the new data plane flow, and
    determining to which network node containing the data plane application of the determined type the new data plane flow is forwarded.

* * * * *